(12) United States Patent
Grosjean

(10) Patent No.: US 6,993,439 B2
(45) Date of Patent: Jan. 31, 2006

(54) MOTOR BASED CONDITION MONITORING

(75) Inventor: Dennis Francis Grosjean, Beavercreek, OH (US)

(73) Assignee: Innovative Scientific Solutions, Inc., Dayton, OH (US)

( * ) Notice: Subject to any disclaimer, the term of this patent is extended or adjusted under 35 U.S.C. 154(b) by 131 days.

(21) Appl. No.: 10/661,213

(22) Filed: Sep. 12, 2003

(65) Prior Publication Data

US 2004/0050177 A1    Mar. 18, 2004

Related U.S. Application Data

(60) Provisional application No. 60/410,406, filed on Sep. 13, 2002.

(51) Int. Cl.
    *G01R 31/34*    (2006.01)
(52) U.S. Cl. ............ 702/66; 702/190; 324/76.12; 324/772
(58) Field of Classification Search ............ 702/33–36, 702/38, 57–59, 64–66, 70, 71, 73–77, 113, 702/115, 182–185, 190; 318/490; 324/76.11, 324/76.12, 76.13, 76.15, 76.19, 76.21, 76.22, 324/76.24, 143, 545, 772
    See application file for complete search history.

(56) References Cited

U.S. PATENT DOCUMENTS

| | | | |
|---|---|---|---|
| 4,527,101 A | 7/1985 | Zavis et al. | |
| 4,744,041 A * | 5/1988 | Strunk et al. | ............ 702/84 |
| 4,961,157 A | 10/1990 | Nick et al. | |
| 4,965,513 A | 10/1990 | Haynes et al. | |
| 4,978,909 A | 12/1990 | Hendrix et al. | |
| 5,270,640 A | 12/1993 | Kohler et al. | |
| 5,461,329 A | 10/1995 | Linehan et al. | |
| 5,483,333 A | 1/1996 | Dancer | |
| 5,483,841 A | 1/1996 | Casada | |
| 5,512,843 A | 4/1996 | Haynes | |
| 5,519,337 A | 5/1996 | Casada | |

(Continued)

OTHER PUBLICATIONS

G. Gregory, "The Arc-Fault Circuit Interrupter: An Emerging Product," IEEE Trans. On Industry Applications, vol. 34, No. 5, pp. 928-933, 1998.

(Continued)

*Primary Examiner*—Marc S. Hoff
*Assistant Examiner*—Manuel L Barbee
(74) *Attorney, Agent, or Firm*—Stevens & Showalter LLP

(57) ABSTRACT

A method of analyzing the condition of a motor driven rotating system using a current waveform produced by the motor. The motor position is initially identified from the current waveform produced by the motor and more particularly, a step of identifying the segment switching of the motor is performed to identify the system position with reference to individual rotations of the motor. The current waveform is then normalized to a preselected number of data points, each rotation being described by the preselected number of data points, such that the current waveform is converted from the time domain to a spatial domain corresponding to positions of the system. Subsequently, a frequency analysis is performed to identify frequencies corresponding to characteristics of the system, including calculating a frequency dependent distribution of the normalized current waveform to determine the energy content of the waveform at particular frequencies.

20 Claims, 4 Drawing Sheets

U.S. PATENT DOCUMENTS

| | | |
|---|---|---|
| 5,521,482 A | 5/1996 | Lang et al. |
| 5,523,701 A | 6/1996 | Smith et al. |
| 5,578,937 A | 11/1996 | Haynes et al. |
| 5,640,103 A | 6/1997 | Petsche et al. |
| 5,739,698 A | 4/1998 | Bowers et al. |
| 6,051,943 A * | 4/2000 | Rabin et al. ............... 318/254 |
| 6,114,871 A | 9/2000 | Shiota et al. |
| 6,128,583 A | 10/2000 | Dowling |
| 6,199,023 B1 * | 3/2001 | Kliman ...................... 702/67 |
| 6,553,816 B1 * | 4/2003 | Palanisamy et al. ....... 73/118.1 |
| 2002/0186039 A1 * | 12/2002 | Devaney et al. ............ 324/772 |

OTHER PUBLICATIONS

J. Smith, "Gear Noise and Vibration," Gear Noise and Vibration, Chap. 12, pp. 153-160, 1999.

* cited by examiner

MOTOR BASED CONDITION MONITORING

CROSS-REFERENCE TO RELATED APPLICATIONS

This application claims the benefit of U.S. Provisional Application No. 60/410,406, filed Sep. 13, 2002, which is incorporated herein by reference.

GOVERNMENT LICENSE RIGHTS

The U.S. Government has a paid-up license in this invention and the right in limited circumstances to require the patent owner to license others on reasonable terms as provided for by the terms of SBIR contract F33615-01-M-2155 awarded by the Propulsion Directorate and the Materials Directorate of the Air Force Research Laboratory.

BACKGROUND OF THE INVENTION

1. Field of the Invention

The present invention relates to monitoring the condition of a motor driven system and, more particularly, to method for monitoring the operating condition of different components of a system through use of signature analysis of the motor current.

2. Description of the Prior Art

Numerous motor driven systems involve periodic motion. For example, motor driven gear systems involve periodic motion and may include various periodicities or frequencies characteristic of the different rotating components or gears forming the system. Various known techniques may be used to measure the characteristics of periodic motion, including in particular detection of variations in repetitive patterns. Small, low-cost accelerometers allow efficient measurement of mechanical vibrations that occur in known directions. In addition, numerous voltage dividers, current transducers, and high gain antennas are available for measuring electrical voltages and currents as well as electric and magnetic fields, including electromagnetic waves.

The signals obtained from system measurements are generally analog signals which are digitized for analysis. Fast digitization of electrical signals can be accomplished with digitizing oscilloscopes and with low-cost analog-to-digital (A/D) converters installed in inexpensive, portable computers. In addition, it is now possible to perform extensive digital signal processing (DSP) with available hardware and software, such as by means of a laptop computer using signal-analysis software.

Motor current signal analysis is a cost effective and non-intrusive method for monitoring the condition of rotating motor driven systems. The operational conditions of rotating equipment, such as a motor driven gear system can be analyzed and related to the maintenance needs of the equipment. In analyses of this type, mechanical load variations in the operating components of the system translate into a variation of the current required to drive the motor. This effect is particularly strong in systems driven by small DC motors and becomes weaker with increasing rotor mass. The variations in current are evident as amplitude modulators or oscillations of the current waveform wherein a substantial and relatively predictable oscillation is associated with each segment switching occurrence of a DC motor, and additional, typically smaller, oscillations in the current waveform are produced as a result of characteristics of the driven system components.

In systems utilizing DC motors, more so than AC driven systems, the speed of the motor will vary somewhat in response to variations in torque load on the motor. As a result of such speed variations, the current waveform produced by the motor is not time stable. Consequently, the spectral content of signals produced by the motor is expansive, resulting in a distribution of energy about an average peak energy. Such a distribution of energy makes it difficult to identify specific frequencies of system components having characteristic frequencies which are close to each other.

U.S. Pat. No. 4,965,513 to Haynes et al. discloses a method for motor signature analysis. The method includes separating out frequency and amplitude components of sensed motor current noise and the source of various changes in load are identified, such as periodic gear mesh loading, friction events at frequencies corresponding to the origin of the events, and other motor load varying characteristics. Motor current noise signatures taken at different times over the operating life of the system are compared to detect aging, wear or abnormal operating characteristics.

U.S. Pat. No. 5,461,329 to Linehan et al. discloses a motor current spectrum analysis method for detecting potential failures of rotating equipment in which spectral frequency resolution is enhanced by collecting a sampled data set completely filled with an exact whole number of stationary carrier waves. The method minimizes the frequency distribution of discrete spectral components in a carrier wave of a known average frequency due to the carrier wave and its components. The method is accomplished by adjusting the sampling rate in such a way that an exact whole number of carrier wave cycles is provided, and including providing an adjustable frequency clock which adjusts its output frequency with the frequency variations of a non-stationary analog carrier wave being analyzed.

While the prior art includes methods for analyzing motor driven systems on the basis of information obtained in the time domain and converted to the frequency domain, such methods are generally applicable to monitoring systems operating at substantially constant speed, such as AC motor driven systems, or by implementing an adjustment in the time domain, i.e., by adjusting a sampling rate, to compensate for speed variations.

SUMMARY OF THE INVENTION

The present invention generally provides a method for analyzing rotating motor driven systems in which time domain current waveform information is gathered from the system and is normalized to spatial domain information, and is subsequently converted to the frequency domain to identify system characteristics with reference to spatial positions of the system. The normalization of the time domain information to the spatial domain is performed with reference to rotation of the motor, such that information relating to movement and position of the system components is available for the frequency domain analysis of the system.

In one aspect of the invention, a method of analyzing operating characteristics of a motor actuated system is provided comprising the steps of: sensing a current drawn by a motor to obtain a current waveform; identifying a characteristic in the current waveform corresponding to a predetermined change of position of the motor; and normalizing the current waveform to the spatial change of position of the motor to define a normalized waveform in the spatial domain.

In a further aspect of the invention, a method of analyzing operating characteristics of a motor actuated system is provided comprising the steps of: sensing a current drawn by a motor to obtain a current waveform; identifying oscillations in the current waveform caused by segment switching; determining a number of oscillations corresponding to one rotation of the motor; and normalizing the current waveform to one rotation of the motor to define a normalized waveform in the spatial domain.

Other features and advantages of the invention will be apparent from the following description, the accompanying drawings and the appended claims.

DETAILED DESCRIPTION OF THE PREFERRED EMBODIMENT

The following description illustrates the invention in terms of a motor driven gear system such as may be embodied in an actuator system powered by a DC motor. It should be understood that the present invention is not limited to the following described embodiment, and is applicable to analysis of data or information derived from a variety of motor driven systems producing periodic amplitude modulations.

Figure 1:
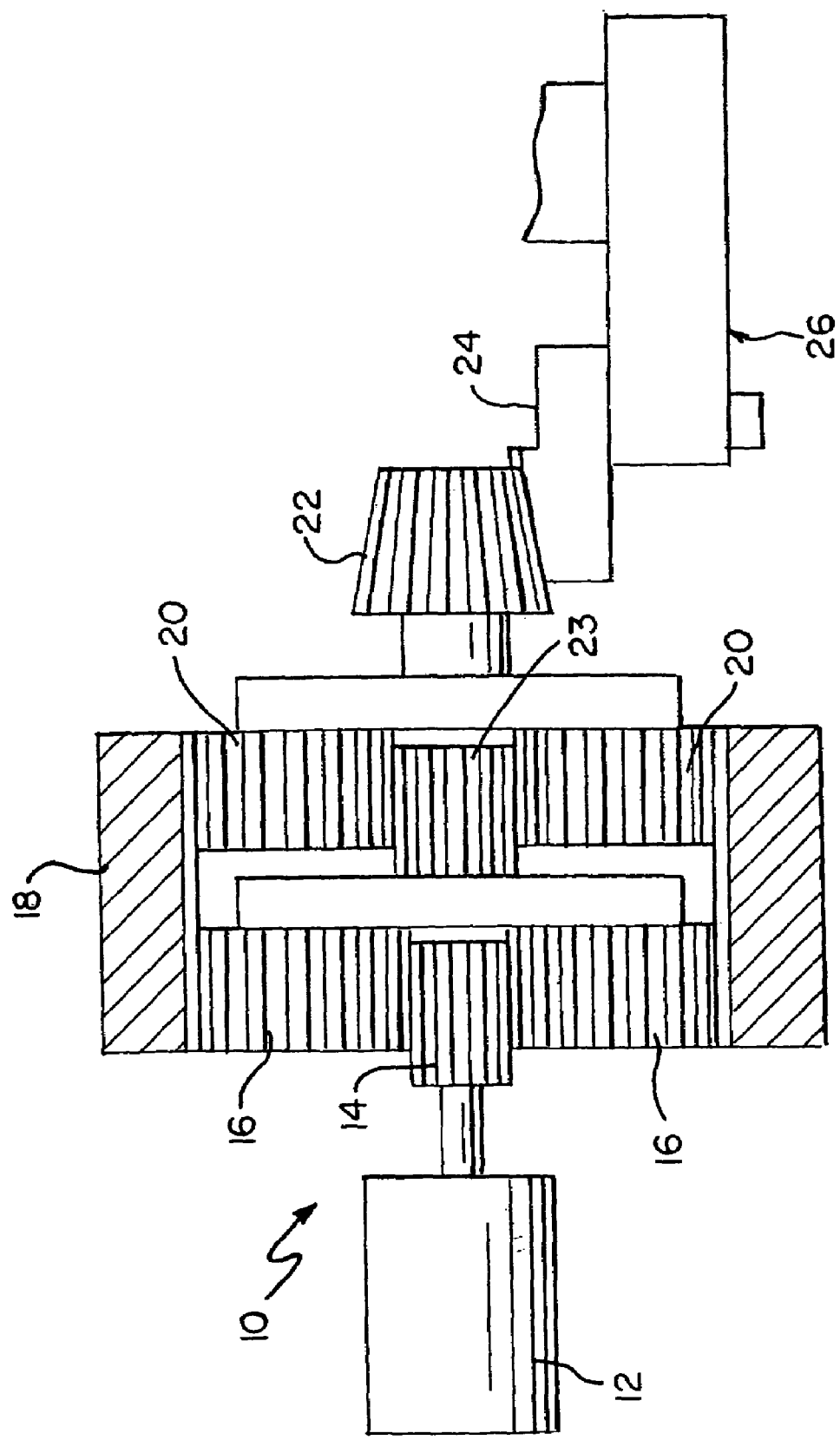
FIG. 1 is a diagrammatic illustration of an example of a motor driven rotating system which may be analyzed by the method of the present invention.

Referring to FIG. 1, a motor driven planetary gear system 10 is illustrated diagrammatically for the purpose of describing the present invention and includes a drive motor 12, a first 9 tooth sun pinion 14 engaged with a first set of 36 tooth planet gears 16 engaged with an 81 tooth ring gear 18 at a 1:10 reduction. The planet gears 16 are connected to a second 15 tooth sun pinion 23 engaged with a second set of 33 tooth planet gears 20 engaged with the ring gear 18, and connected with and driving a 15 tooth output bevel pinion gear 22 at a 1:6.4 reduction. The output bevel pinion gear 22 is engaged with a 42 tooth bevel drive segment 24 on a rotating output component 26. The motor 12 for purposes of the present description comprises a 24 VDC permanent magnet motor having 4 poles and 13 segments.

Figure 2:
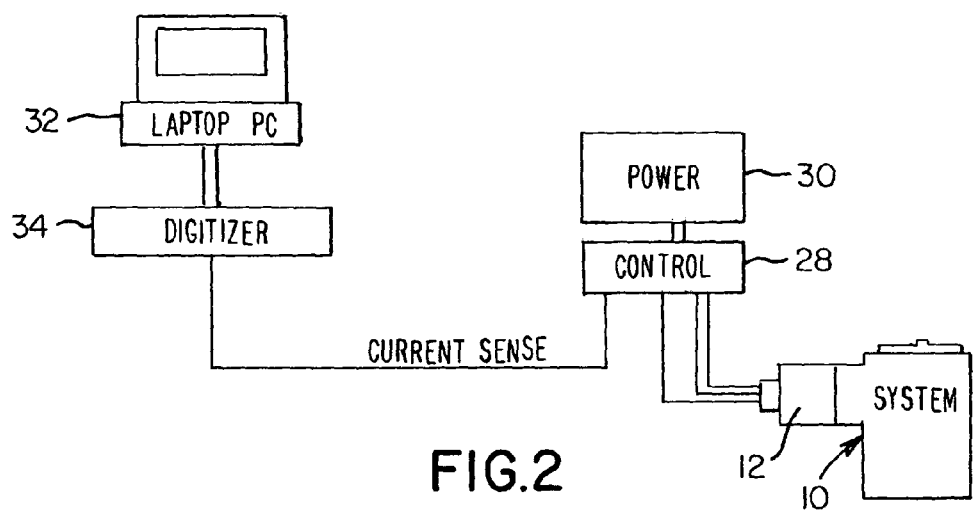
FIG. 2 is a block diagram of a hardware set-up for use in performing the present invention.

FIG. 2 is a block diagram illustrating the hardware setup, such as may be used for a test setup, for collecting data from the system 10 and includes a control 28 connected to a power source 30 for providing power to the motor 12 for the system 10. The control 28 additionally monitors current to the motor 12 and provides a current waveform to a computer 32, such as a laptop PC, which includes digitizer 34 for digitizing the analog current waveform and which further includes processing software for performing the data analysis in accordance with the method described below. It should be understood that the hardware described herein is for illustrative purposes only and may be provided in other forms for practical application of the system 10, such as in the form of a controller for controlling a motor and including a processor for providing processing and analysis of the current signals.

Most moving mechanical components in a motor-driven system exhibit characteristic frequencies. For example, Table 1 below describes characteristic frequencies associated with different components of the system 10 illustrated in FIG. 1 and, in particular, the characteristic frequencies are described as a function of motor rotation. In addition to the fundamental frequencies associated with each of the components, frequencies indicative of a glitch or defect in the components are also given in Table 1. The frequencies given in Table 1 are predicable for known physical characteristics of the system components and are useful in analyzing the condition of the system 10. It should be noted that additional frequency characteristics of the system 10 may result from other components forming the system 10, such as bearings associated with the motor 12 and gears of the system 10, which are not discussed in the present illustrated embodiment.

TABLE 1

| SOURCE | FREQUENCY (Rot$^{-1}$) |
|---|---|
| Motor Rotation | 1 |
| Rotor Segments | 13 |
| Poles | 4 |
| 1$^{st}$ Sun Gear | |
| - Gear | 8.1 |
| - Glitch | 2.7 |
| 1$^{st}$ Planet Gear | |
| - Gear | 8.1 |
| - Glitch | 0.45 |
| 1$^{st}$ Ring Gear | |
| - Gear | 8.1 |
| - Glitch | 0.3 |
| 2$^{nd}$ Sun Gear | |
| - Gear | 1.266 |
| - Glitch | 0.253 |
| 2$^{nd}$ Planet Gear | |
| - Gear | 1.266 |
| - Glitch | 0.077 |
| 2$^{nd}$ Ring Gear | |
| - Gear | 1.266 |
| - Glitch | 0.047 |
| Bevel Pinion | |
| - Gear | 0.234 |
| - Glitch | 0.016 |
| Bevel Drive (Segment) Gear | 0.234 |

Figure 3:
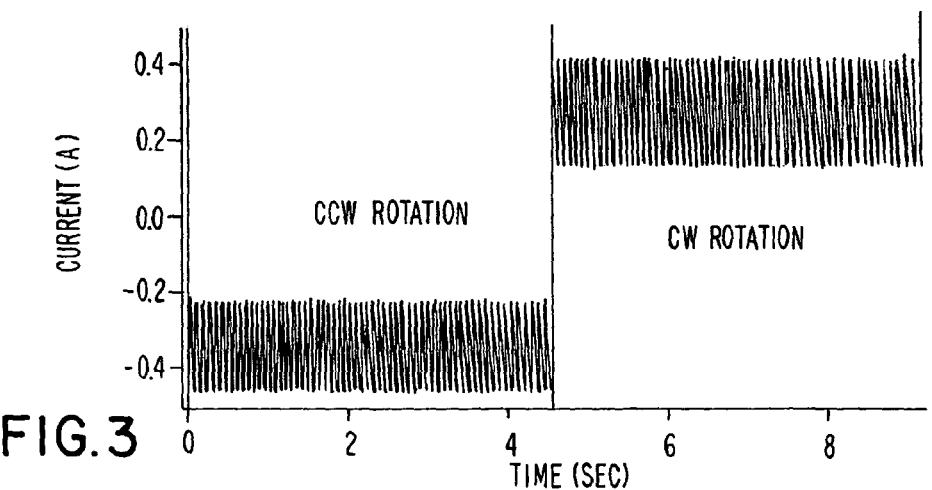
FIG. 3 is a schematic depiction of a current waveform produced by the motor of the rotating system of FIG. 1.
Figure 4:
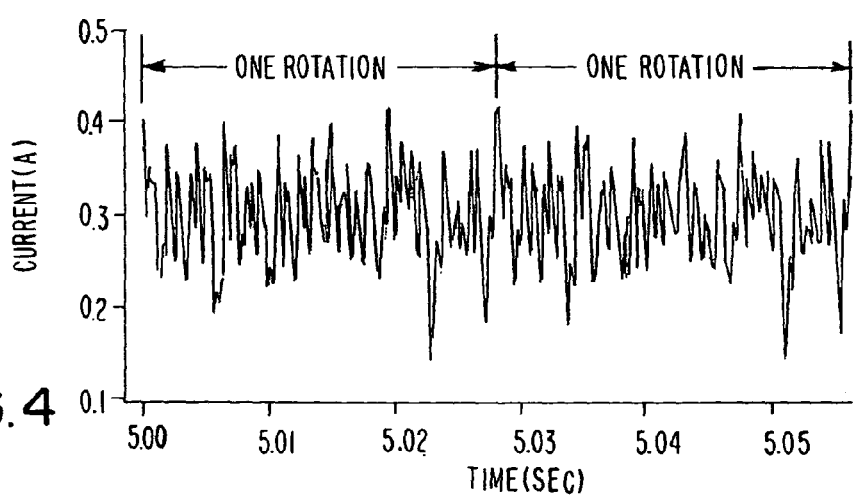
FIG. 4 illustrates the motor current waveform associated with two rotations of the motor.

The current waveform associated with operation of the motor 12 is characterized by multiple amplitude modulations resulting from brush noise caused by commutator switching, and further includes other low-frequency information useful for analysis of the condition of the system 10. FIG. 3 illustrates a current waveform produced by the motor 12 of the system 10 of FIG. 1 when operated in a clockwise and counterclockwise direction between opposing end stops (not shown) for the rotating output component 26, and FIG. 4 shows a typical motor current waveform associated with two rotations of the motor 12 and illustrating the repeatability of the waveform in successive rotations.

When a load torque increase occurs within the system 10, such as a periodic load torque increase caused by a component defect, the motor speed decreases and current increases. This results in a decrease in brush frequency and an increase in the current amplitude. Accordingly, for a cyclical load change, both a frequency modulation and an amplitude modulation will occur, which are both useful for the system analysis in accordance with the method of the present invention. Specifically, amplitude modulation provides an indication of the physical position of the system components and the frequency analysis of the present method is performed as a function of the amplitude modulation, and therefore provides frequency analysis information about the system 10 relative to the physical position of the components of the system 10.

Generally, the method of the present invention initially identifies the motor position from the current waveform produced by the motor 12, and more particularly identifies the segment switching of the motor 12 in order to identify the motor position corresponding to individual rotations of the motor 12. The current waveform is then normalized to a preselected number of data points, each rotation being described by the preselected number of data points, such that the current waveform is converted from the time domain to a spatial domain corresponding to positions of the components of the system 10. Subsequently, a frequency analysis is performed to identify frequencies corresponding to characteristics of the system 10, including calculating a frequency dependent distribution of the normalized waveform to determine the energy content of the waveform at particular frequencies.

Figure 5:
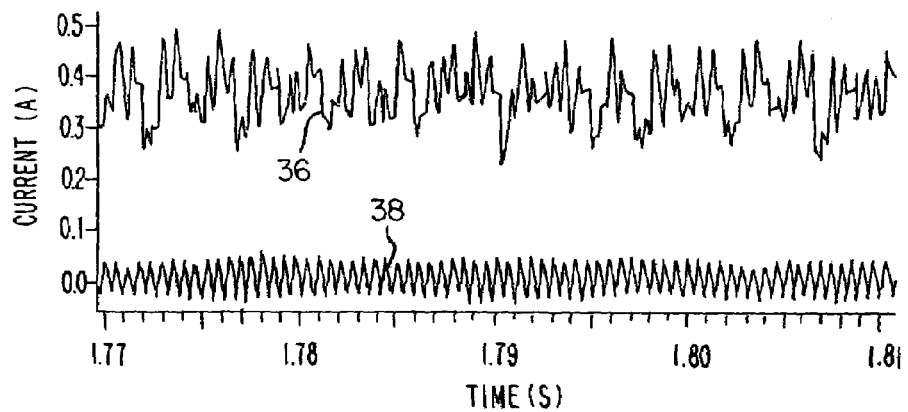
FIG. 5 illustrates a motor current waveform and an associated filtered waveform formed using a band-pass filter.

In a preferred embodiment of the invention, the step of determining current waveform sections corresponding to individual rotations of the motor 12 comprises performing a digital filter operation on the current waveform to permit isolation of the oscillations caused by segment switching. In the particular example described above, including a 4-pole, 13-segment motor 12, the most stable frequency component for determination of the rotational position is equal to the rotational speed of the motor times 52 (4 poles×13 segments=52). The dominant rotational speed of the motor 12 may be determined by a conventional frequency analysis, such as a Fast Fourier Transform (FFT), of the current waveform. If variations in speed are significant, the total waveform may be divided into temporal portions that contain small variations. A narrow-band-pass filter may be used to form a filtered waveform, enabling specific identification of the segment switching components of the waveform, as illustrated in FIG. 5, showing an original current waveform 36 and corresponding filtered waveform 38. In the illustrated example the motor 12 is operated at about 2100 rpm, resulting in a fundamental brush frequency of 1820 Hz. Application of a 1700–1900 Hz band-pass filter results in removal of all but the fundamental brush noise component, and this roughly sinusoidal signal can be easily scanned for peaks, counting 52 peaks per motor rotation.

After determination of the location of the peaks on the current waveform corresponding to each rotation of the motor 12, the number of time steps between known rotational positions, i.e., number of time steps for each complete rotation, is determined. The number of time steps is dependent on the digitization rate, which is constant, and is likely to vary somewhat as a result of variations in the motor speed. For example, at a digitization rate of 20 kHz and a motor speed of 2100 rpm, the time span for a rotation is 28.57 msec and encompasses 571 points; alternatively, for the same digitization rate and a motor speed of 2160 rpm, the time span for a rotation is 27.78 msec and encompasses 556 points. In order to normalize each rotation of the waveform to the same number of digitization or data points, a set number of points, such as 575 points, is selected to define a preselected number of data points for the normalization. The digitized current waveform data from each rotation of the motor 12, i.e., each 52 peaks, is normalized to the preselected number of points such that the current waveform is defined in a spatial domain with reference to each rotation of the motor 12, and notably is defined in a manner which is independent of the speed of the motor 12. It should be noted that since the normalization will necessarily require including points not originally included in the waveform to provide the preselected number of points with corresponding values, additional data point values are provided by conventional interpolation techniques. Further, the interpolation routine is employed to set the width of one motor rotation equal to the number of data points and in order to permit conventional time domain based data processing routines to be employed in analysis of the data, a time between data points is set to 1/(number of data points) sec. In the above example in which 575 data points are selected, the artificially selected time between data points would be 1/575 sec=1.739 msec. High speed processing permits piecing together of the individual 52-peak sections into an entire waveform normalized to one rotation per the number of preselected points. It should be pointed out that the number of data points chosen to represent one rotation is arbitrary. In some digital-processing methods, processing efficiency may be enhanced when the number of points is equal to an integer power of two, such as 512.

A frequency analysis may then be performed using available software designed to operate on time domain data, in that the rotational frequency (1/rev) of the normalized data is equivalent to 1 Hz as processed by conventional software. An example of software that may be used to process the data to perform a frequency analysis is the waveform analysis software IGOR, which is a product of WaveMetrics, Inc. of Lake Oswego, Oreg. Thus, while the data analysis software assumes the input data to be time domain data, the analysis is actually provided relative to the spatial position of the motor 12.

Figure 6:
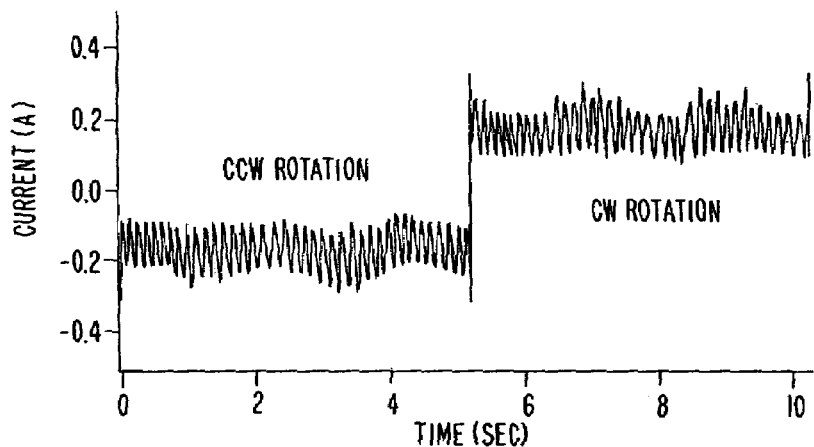
FIG. 6 is a schematic depiction of a current waveform produced by the motor of the rotating system of FIG. 1 and including noise resulting from gear binding in the system.
Figure 7:
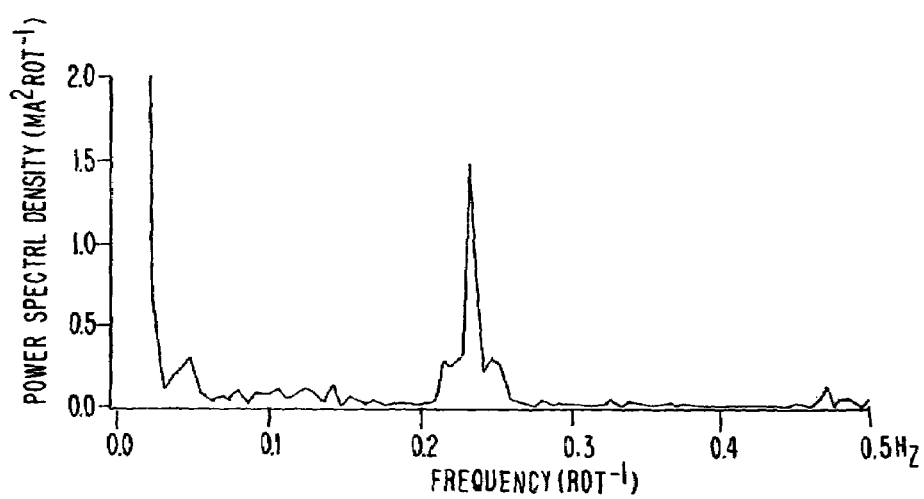
FIG. 7 illustrates a power spectral density plot of a portion of the plot of FIG. 6 taken at the frequency at which the gear binding occurs.

Referring to FIG. 6, an example of the current waveform resulting from operation of the system 10 of FIG. 1 is illustrated, in which operation of the system 10 rotating through a cycle of counter-clockwise and clockwise movement is shown. The system 10 of this example exhibits a significant amount of noise at a gear frequency of 0.234 $Rot^{-1}$, as may be seen with further reference to FIG. 7. FIG. 7 illustrates a portion of the frequency plot resulting from application of the method of the present invention, and in particular shows a portion of the frequency plot corresponding to system movement in the clockwise direction. As may be seen with reference to Table 1 above, the occurrence of significant energy at a frequency of 0.234 $Rot^{-1}$ corresponds to the bevel-gear frequency and indicates excessive wear or binding in the bevel-gear system. In addition, it can be seen that sidebands at 0.016 $Rot^{-1}$ are present on each side of the 0.234 $Rot^{-1}$ indicating that the bevel-gear binding is synchronized to the rotation of the bevel-pinion gear 22, and consequently indicating a defect particularly associated with the bevel-pinion gear 22.

Figure 8:
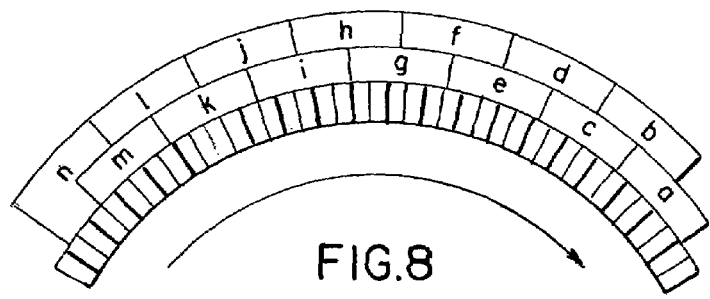
FIG. 8 illustrates the output component for the system of FIG. 1 divided into labeled overlapping sections for analysis.
Figure 9A:
FIGS. 9(a)–(n) illustrate power spectral density plots for the labeled sections of the output component shown in FIG. 8.
Figure 9F:
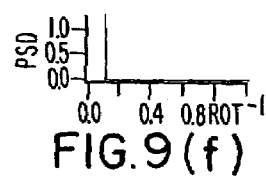
Figure 9K:
Figure 9B:
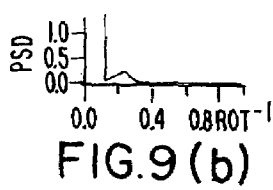
Figure 9G:
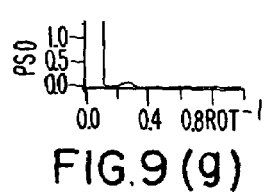
Figure 9L:
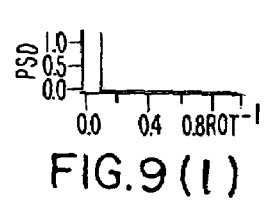
Figure 9C:
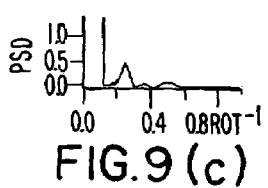
Figure 9H:
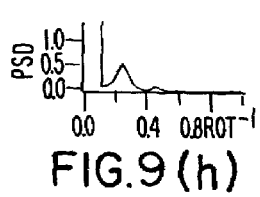
Figure 9M:
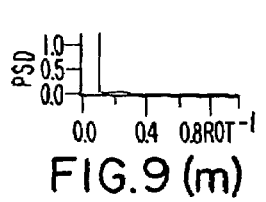
Figure 9D:
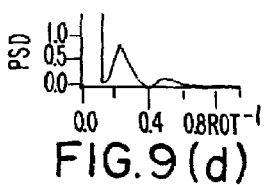
Figure 9I:
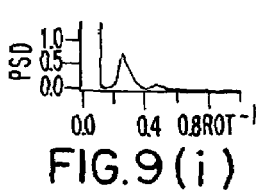
Figure 9N:
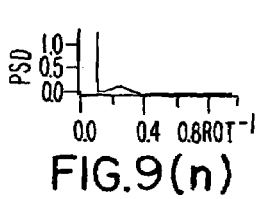
Figure 9E:
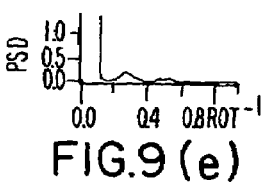
Figure 9J:
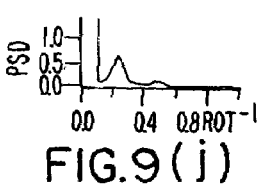

Since the frequency analysis of the present method is made with reference to the spatial domain, it is possible to perform the frequency analysis on particular sections of the system 10 in order to provide greater detail from the analysis. For example, FIG. 8 illustrates the bevel-segment gear 24 for the system 10 of FIG. 1 divided into overlapping sections labeled with letters a–n, and FIGS. 9(a)–(n) illustrate corresponding frequency plots taken at each of the labeled areas of the bevel-segment gear 24. From this detailed analysis, it can be seen that increased energy at the frequency of 0.234 $Rot^{-1}$ occurs first at the overlap of sections c and d, and again centered in section i. In addition, the 0.234 $Rot^{-1}$ frequency is also increasing in section n. The spacing of these three sections corresponds to one rotation of the bevel-pinion gear 22, thus confirming the source of the 0.016 $Rot^{-1}$ sidebands previously noted.

It should be apparent from the above description that the method of the present invention enables analysis of a rotating system in a manner which is independent of the rotational speed, or speed variations, of the motor. Further, the present method facilitates analysis of individual components of a rotating system by converting the analysis from a time domain to a spatial domain, and referencing the spatial positions of the components to derive detailed frequency information relating to the condition of the components.

While the method herein described constitutes a preferred embodiment of this invention, it is to be understood that the invention is not limited to this precise method, and that changes may be made therein without departing from the scope of the invention which is defined in the appended claims.

The invention claimed is:

1. A method of analyzing operating characteristics of a motor actuated system comprising the steps of:
   sensing a current drawn by a motor for driving the system to obtain a current waveform in the time domain;
   identifying a predetermined number of brush-switching peaks in the current waveform corresponding to a predetermined rotational travel of the motor; and
   setting a width of the current waveform, defined by the predetermined number of brush-switching peaks, equal to a predetermined number of equally spaced increments to normalize the current waveform from the time domain to a set of data points defining a waveform in the spatial domain corresponding to the predetermined rotational travel of the motor.

2. The method of claim 1 wherein the step of identifying brush-switching peaks comprises filtering the current waveform to define a filtered waveform.

3. The method of claim 1 including the step of performing a frequency analysis on the normalized waveform in the spatial domain.

4. The method of claim 3 wherein the frequency analysis comprises calculating a frequency dependent distribution of the normalized waveform in the spatial domain to determine the relative energy distribution of the waveform in the spatial domain.

5. The method of claim 4 wherein the frequency analysis further comprises identifying frequencies associated with components of the system and evaluating the energy content of the normalized waveform in the spatial domain at the identified frequencies.

6. The method of claim 4 wherein the frequency dependent distribution comprises a power-spectral-density of the normalized waveform in the spatial domain.

7. The method of claim 3 wherein the frequency analysis is performed over the entire normalized waveform in the spatial domain comprising multiple rotations of the motor.

8. The method of claim 3 wherein the normalized waveform in the spatial domain is divided into discrete overlapping parts, and the frequency analysis is performed on each part of the normalized waveform in the spatial domain.

9. The method of claim 3 wherein the frequency analysis comprises identifying system characteristics corresponding to identifiable rotational positions of the motor.

10. The method of claim 1 wherein the predetermined number of brush-switching peaks corresponds to a single rotation of the motor.

11. The method of claim 1 including the step of applying a time domain based processing analysis to the waveform in the spatial domain to analyze characteristics of a system driven by the motor.

12. The method of claim 1 further including the step of sequentially ordering a plurality of sets of data points, where each set of data points corresponds to the predetermined rotational travel of the motor, to define a continuous current waveform in the spatial domain.

13. A method of analyzing operating characteristics of a motor actuated system comprising the steps of:
   sensing a current drawn by a motor for driving the system to obtain a current waveform in the time domain;
   filtering the current waveform about a band corresponding to a rotational frequency of the motor;
   identifying a predetermined number of peaks in the filtered current waveform corresponding to a predetermined rotational travel of the motor;
   defining a width of the unfiltered current waveform using the predetermined number of peaks of the filtered current waveform; and
   setting the defined width of the unfiltered current waveform equal to a predetermined number of equally spaced increments to normalize the unfiltered current waveform from the time domain to a set of data points defining a waveform in the spatial domain corresponding to the predetermined rotational travel of the motor.

14. The method of claim 13 wherein the predetermined number of peaks corresponds to a single rotation of the motor.

15. The method of claim 13 including the step of applying a time domain based processing analysis to the waveform in the spatial domain to analyze characteristics of a system driven by the motor.

16. The method of claim 13 further including the step of sequentially ordering a plurality of sets of data points, where each set of data points corresponds to the predetermined rotational travel of the motor, to define a continuous current waveform in the spatial domain.

17. A method of analyzing operating characteristics of a motor actuated system comprising the steps of:
   sensing a current drawn by a motor for driving the system to obtain a current waveform in the time domain;
   analyzing the current waveform to determine a dominant frequency band corresponding to a rotational frequency of the motor;
   filtering the current waveform about the band corresponding to the rotational frequency of the motor;
   identifying a predetermined number of peaks in the filtered current waveform corresponding to a predetermined rotational travel of the motor;

defining a width of the unfiltered current waveform using the predetermined number of peaks of the filtered current waveform; and setting the defined width of the unfiltered current waveform equal to a predetermined number of equally spaced increments to normalize the unfiltered current waveform from the time domain to a set of data points defining a waveform in the spatial domain corresponding to the predetermined rotational travel of the motor.

18. The method of claim 17 wherein the predetermined number of peaks corresponds to a single rotation of the motor.

19. The method of claim 17 including the step of applying a time domain based processing analysis to the waveform in the spatial domain to analyze characteristics of a system driven by the motor.

20. The method of claim 17 further including the step of sequentially ordering a plurality of sets of data points, where each set of data points corresponds to the predetermined rotational travel of the motor, to define a continuous current waveform in the spatial domain.

* * * * *